July 14, 1942.  R. M. WILLIAMS ET AL  2,289,817
ICE CREAM CAN HOLD-DOWN
Filed Feb. 18, 1941

Inventors
Roy M. Williams
George J. Kramer
By Clarence A. O'Brien
Attorney

Patented July 14, 1942

2,289,817

UNITED STATES PATENT OFFICE 2,289,817

ICE CREAM CAN HOLD-DOWN

Roy M. Williams and George J. Kramer,
Niles, Ohio

Application February 18, 1941, Serial No. 379,512

4 Claims. (Cl. 248—154)

The present invention relates to improvements in attachments for ice cream dispensing cabinets and has for its primary object to provide means for engaging the cans of ice cream positioned in the cabinet for holding the same against movement while the ice cream is being dipped or scooped therefrom.

More specifically, the invention comprises a spring retracted hook having one end secured to a fixed bracket secured within the cabinet and having a hook formed at the other end of the spring for engaging the upper edge of the can to hold the same against movement.

A still further object is to provide an attachment of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1:
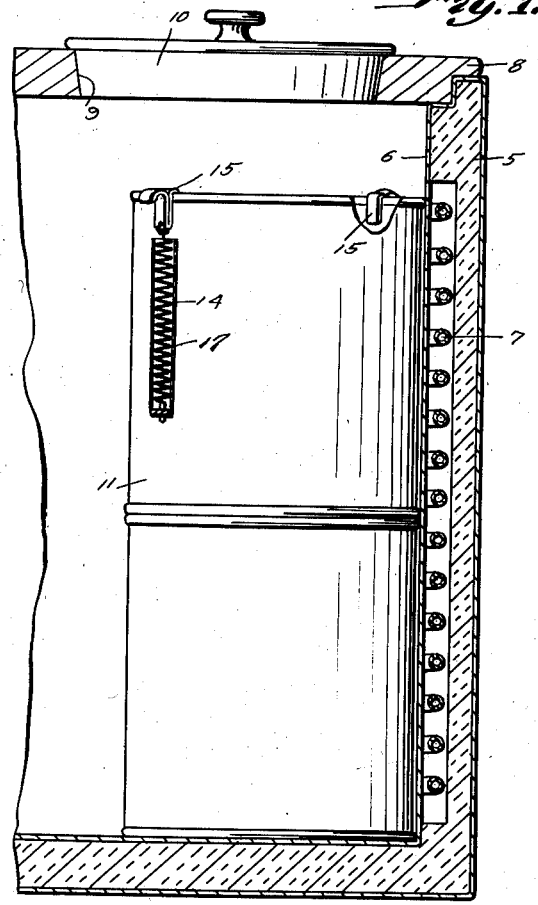
Figure 3:
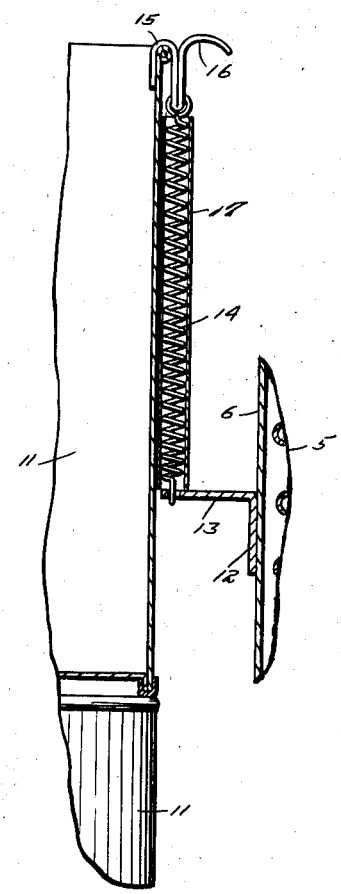
Figure 2:
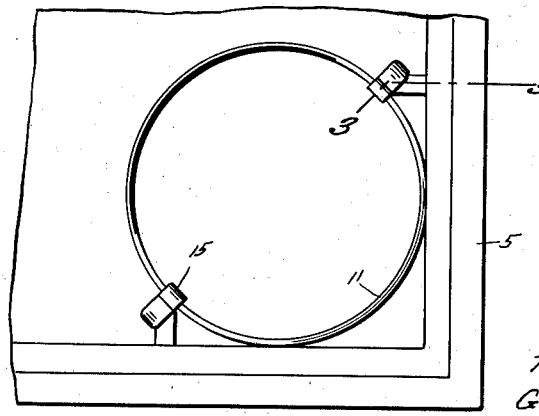

Figure 1 is fragmentary vertical sectional view of an ice cream cabinet showing the hold-down attachment in position therein, Figure 2 is a top plan view with the top of the cabinet removed, and Figure 3 is a sectional view taken substantially on a line 3—3 of Figure 2.

Referring now to the drawing in detail, wherein for the purpose of illustration I have disclosed a preferred embodiment of the invention, the numeral 5 designates an ice cream cabinet of conventional construction which includes the metal lining 6 behind which is positioned the freezing coils 7. The cabinet also includes the removable top 8 having the openings 9 formed therein in which are fitted the lids 10 to provide access to the cans of ice cream 11 positioned in the cabinet.

Cabinets of this character are usually constructed of a size for holding ice cream cans in stacked relation therein so that the uppermost can is accessible through the openings 9 of the top. In order to secure the uppermost can 11 against movement while the ice cream is being dipped or scooped therefrom, we provide a plurality of angular brackets 12 having one edge welded or otherwise fixedly secured to the lining 6, the brackets including an inwardly projecting arm 13 to which is secured the lower end of an expansible coil spring 14 having a hook member 15 attached at its other end and adapted for engaging over the upper edge of the can 11 for securing the can against movement. The hook 15 also includes a finger grip portion 16 to facilitate releasing of the hook from engagement with the can. A tubular casing 17 is provided for the spring 14.

From the foregoing it will be apparent that when the cans are placed in position as shown in Figure 1 of the drawing, that the hooks 15 may be placed over the upper edge of the can and the can will then be firmly secured against movement while the ice cream is being dipped or scooped therefrom.

It is believed the details of construction, advantages and manner of use of the device will be readily understood from the foregoing without further detailed explanation.

Having thus described the invention, what we claim is:

1. An ice cream can hold-down attachment for ice cream dispensing cabinets and comprising a hook engageable over the upper edge of the can, a finger-gripping member projecting from the back of the hook, said hook including a shank portion, and spring means having one end secured to the shank of the hook and having its other end fixedly secured in the cabinet to secure the can against movement.

2. An ice cream can hold-down device for ice cream dispensing cabinets, said hold-down comprising a bracket secured to the inner wall of the cabinet at a point intermediate the top and bottom wall of the cabinet, a coil spring attached at one end to the bracket, a hook attached to the other end of the spring and adapted for engaging over the upper edge of the can and a finger gripping member projecting rearwardly from the hook.

3. An ice cream can hold-down device for ice cream dispensing cabinets, said hold-down comprising a bracket secured to the inner wall of the cabinet at a point intermediate the top and bottom wall of the cabinet, a coil spring attached at one end to the bracket, a hook attached to the other end of the spring and adapted for engaging over the upper edge of the can, a finger gripping member projecting rearwardly from the hook and a rigid sleeve surrounding the spring with its lower end abutting the bracket and its upper end engaged by the hook and finger gripping member to exert a downward pressure on the sleeve for supporting the sleeve in an upright position when the hook is released.

4. Means for removably securing one container within another and comprising a hook releasably engaging the upper edge of the inner container, a finger-gripping extension projecting rearwardly from the hook, said hook also including a shank portion, an expansible coil spring connected at one end to said shank of the hook and extending downwardly between the walls of the containers, a bracket carried by an inner wall of the outer container and to which the lower end of the spring is attached, and a rigid tubular member surrounding the spring with its lower end resting on the bracket, said hook and finger-grip engaging diametrically opposite edges of the top of the tubular member when the hook is released from the inner container, and said spring exerting a downward pressure on the hook and finger-grip to retain the tubular member in an upright position on the bracket.

ROY M. WILLIAMS.
GEORGE J. KRAMER.